United States Patent
Abdo et al.

(10) Patent No.: US 10,807,049 B2
(45) Date of Patent: Oct. 20, 2020

(54) MACHINE FOR HOMOGENISING A FOOD SUBSTANCE

(71) Applicant: NESTEC S.A., Vevey (CH)

(72) Inventors: Samer Abdo, Lonay (CH); Sylvain Decastel, Remaufens (CH); Jean-Luc Denisart, Cully (CH); Bertrand Guyon, Saint Point Lac (FR); Marco Magatti, Lausanne (CH); Alexa Perrin, Savigny (CH); Didier Pont, Baulmes (CH); Mohamed Raad, Lausanne (CH); Laurent Seydoux, Gillarens (CH)

(73) Assignee: Societe des Produits Nestle S.A., Vevey (CH)

( * ) Notice: Subject to any disclaimer, the term of this patent is extended or adjusted under 35 U.S.C. 154(b) by 140 days.

(21) Appl. No.: 15/573,625

(22) PCT Filed: Jun. 15, 2016

(86) PCT No.: PCT/EP2016/063664
§ 371 (c)(1),
(2) Date: Nov. 13, 2017

(87) PCT Pub. No.: WO2016/202814
PCT Pub. Date: Dec. 22, 2016

(65) Prior Publication Data
US 2018/0126339 A1  May 10, 2018

(30) Foreign Application Priority Data
Jun. 16, 2015 (EP) .................................... 15172386

(51) Int. Cl.
*B01F 13/08* (2006.01)
*B01F 3/04* (2006.01)
(Continued)

(52) U.S. Cl.
CPC ......... *B01F 3/04453* (2013.01); *A47J 27/004* (2013.01); *A47J 43/0465* (2013.01);
(Continued)

(58) Field of Classification Search
CPC .................................................... B01F 13/0845
(Continued)

(56) References Cited

U.S. PATENT DOCUMENTS 1,242,493 A * 10/1917 Stringham .......... B01F 13/0827
310/211
1,420,774 A * 6/1922 Stainbrook ......... A47J 43/0465
241/46.017
(Continued)

FOREIGN PATENT DOCUMENTS

CN          2367222 Y       3/2000
CN          1684617 A      10/2005
(Continued)

OTHER PUBLICATIONS

China Patent Office Communication for Application No. 201680034921.7, dated Apr. 26, 2020, 17 pages.

*Primary Examiner* — David L Sorkin
(74) *Attorney, Agent, or Firm* — K&L Gates LLP

(57) ABSTRACT

A machine (1) for homogenising a food substance has: a container (10) with a side wall (11) and a bottom wall (12) delimiting a cavity (10'); an impeller (30) with an impelling member (31) forming an impelling surface (31',31",31') that is drivable in rotation (r) about a central axial direction (30') of the impelling surface (31',31",31''') for imparting a mechanical effect to the food substance; and a module (20) which has a housing means (22') that contains an inner chamber (22,22a) and that delimits a seat (21) for the container (10), the chamber (22,22a) containing an electric motor (24). The electric motor (24) has an output drive axis
(Continued)

(24') with a driver device (24") configured to drive a follower device (35) of the impeller (30). The driver device (24") and the follower device (35) are magnetically coupled through a sidewall (11) and/or bottom wall (12) of the container (10). The driver device (24") comprises a ferromagnetic or magnetic field-generating element (24a) that is arranged to be magnetically coupled to a corresponding ferromagnetic or magnetic field-generating element (36) of the follower device (35). The follower device (35) extends over a predominant part of the bottom wall (12) of the container (10) or across a substantial part of the wall (12) along a diameter thereof. The driver device (24) extends over a predominant part of a bottom part of the seat (21) or across a substantial part of the bottom part of the seat (21) along a diameter thereof. The ferromagnetic and magnetic field generating elements (24a,36) are positioned at extremal or peripheral parts of the follower device (35) and of the driver device (24").

20 Claims, 3 Drawing Sheets

(51) Int. Cl.
*A47J 43/046* (2006.01)
*A47J 27/00* (2006.01)
*B01F 7/00* (2006.01)
*B01F 7/26* (2006.01)
*B01F 15/06* (2006.01)

(52) U.S. Cl.
CPC ............ *B01F 7/00458* (2013.01); *B01F 7/26* (2013.01); *B01F 13/0827* (2013.01); *B01F 13/0854* (2013.01); *B01F 15/065* (2013.01); *B01F 15/067* (2013.01); *B01F 2015/061* (2013.01); *B01F 2015/062* (2013.01); *B01F 2215/0006* (2013.01)

(58) Field of Classification Search
USPC .................................................. 366/273, 274
See application file for complete search history.

(56) References Cited

U.S. PATENT DOCUMENTS

| | | | | |
|---|---|---|---|---|
| 2,459,224 | A * | 1/1949 | Hendricks | A47J 43/0465 310/96 |
| 2,518,758 | A * | 8/1950 | Cook | B01F 13/0818 15/220.2 |
| 2,549,121 | A | 4/1951 | Osterheld | |
| 3,028,476 | A * | 4/1962 | Hug | H02K 49/108 219/201 |
| 3,168,294 | A | 2/1965 | Hasumura | |
| 2013/0042767 | A1* | 2/2013 | Alet Vidal | A47J 36/16 99/357 |
| 2018/0160858 | A1* | 6/2018 | Abdo | A47J 43/0722 |

FOREIGN PATENT DOCUMENTS

| | | |
|---|---|---|
| CN | 1835700 A | 9/2006 |
| CN | 201200323 Y | 3/2009 |
| CN | 201346128 Y | 11/2009 |
| CN | 203226213 U | 10/2013 |
| CN | 203539159 U | 4/2014 |
| DE | 1724140 U | 6/1956 |
| DE | 102007063549 | 6/2009 |
| DE | 202012104657 | 4/2014 |
| WO | 2004016344 A1 | 2/2004 |

* cited by examiner

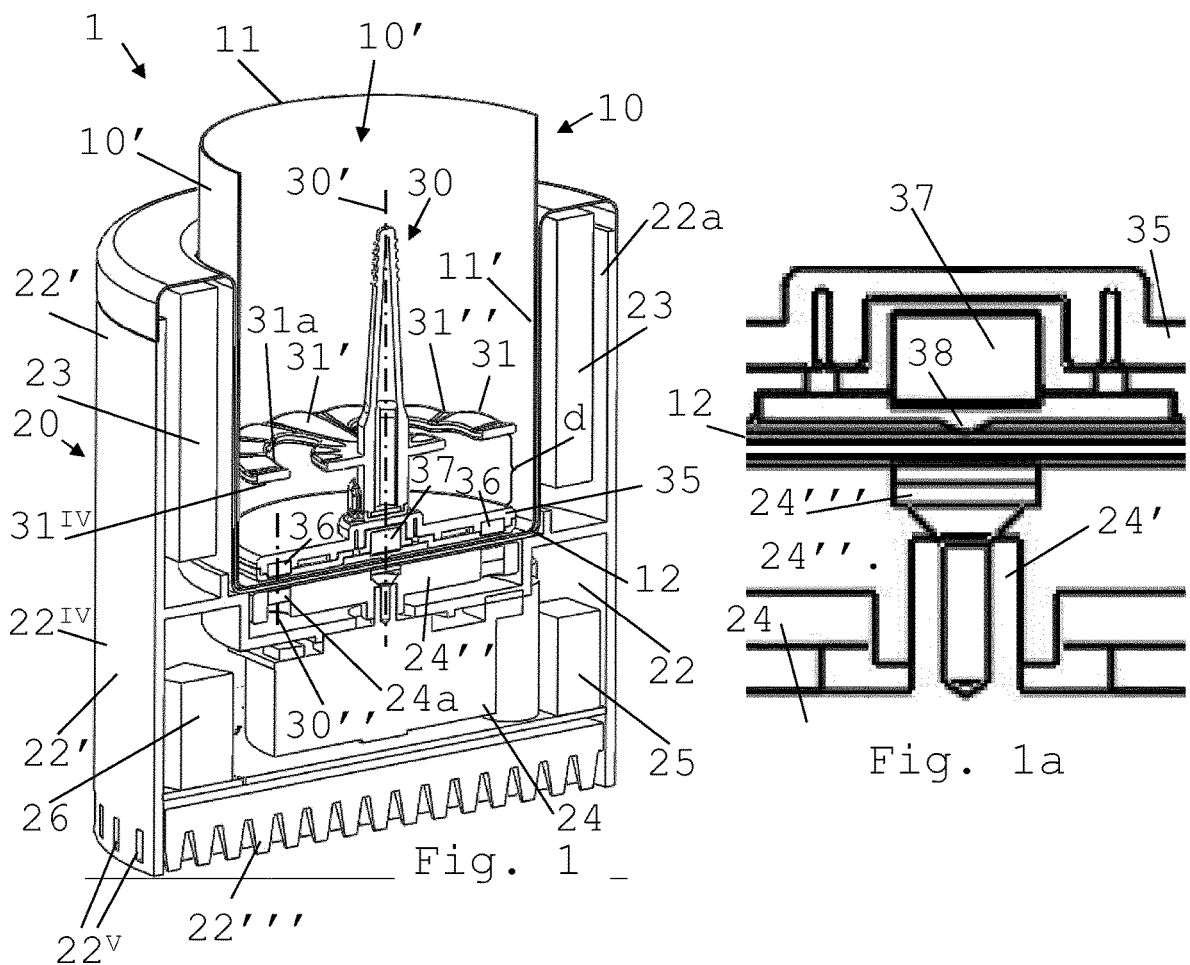
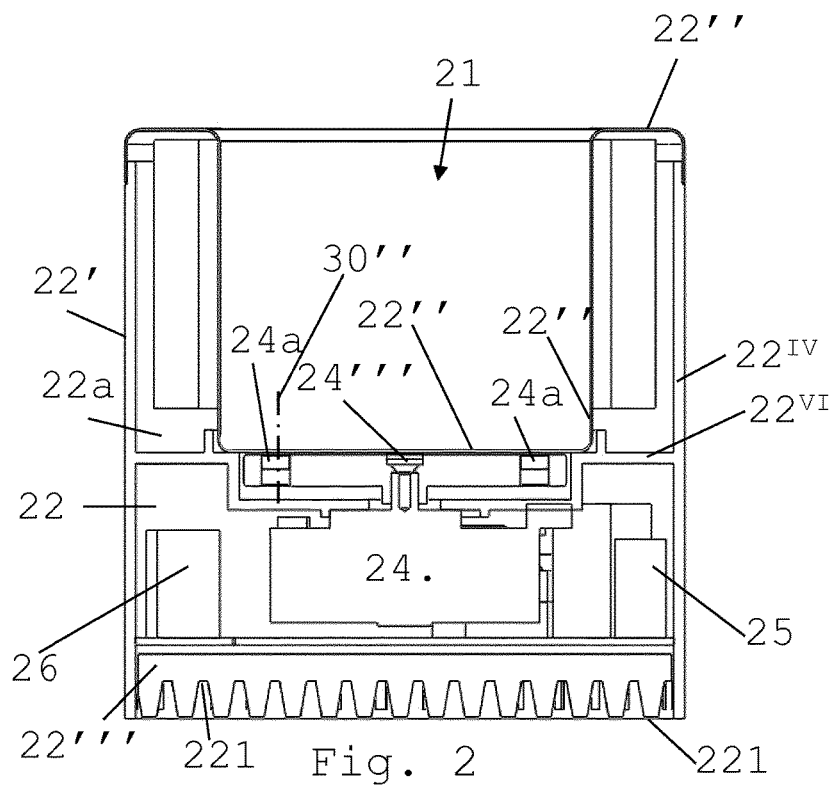

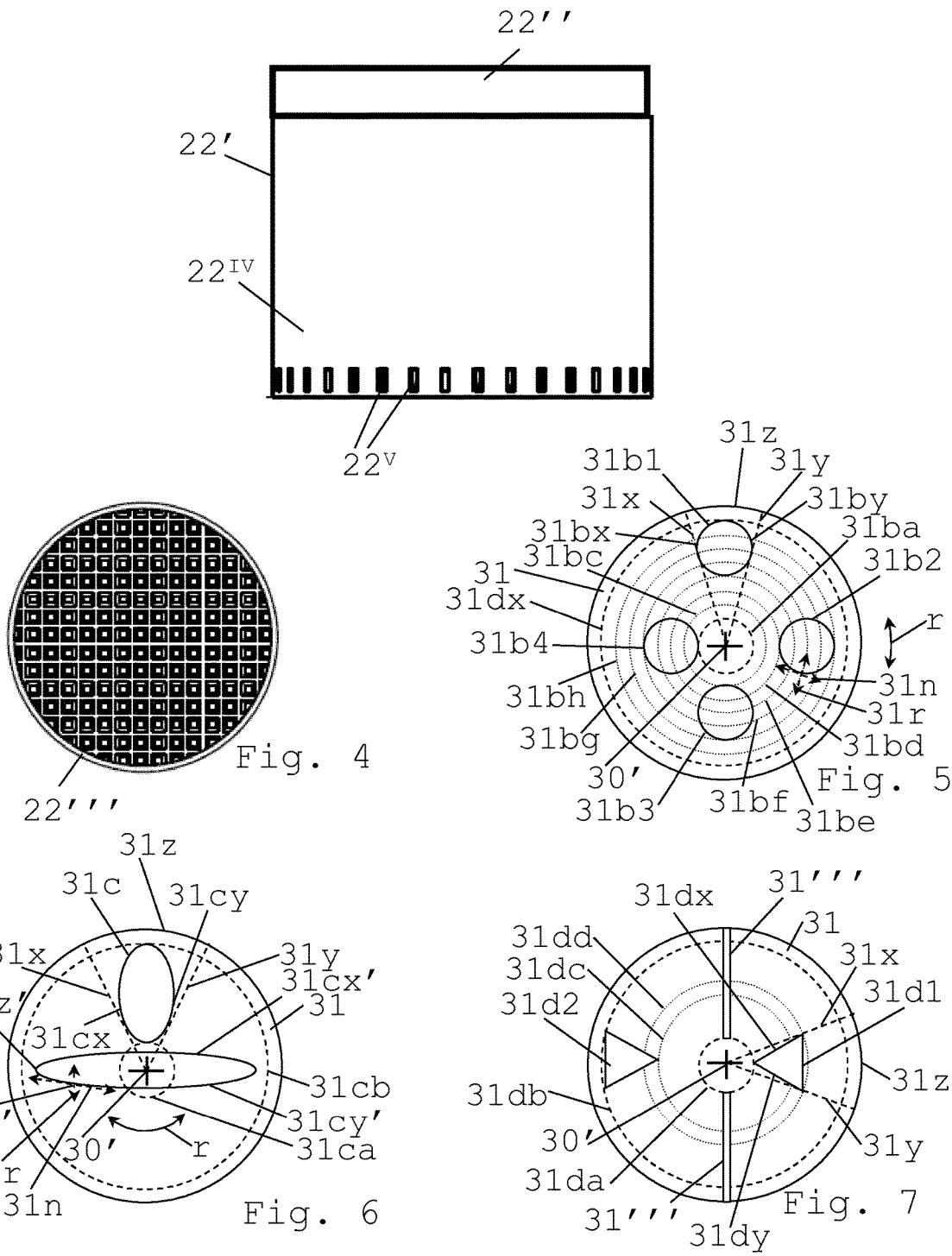

MACHINE FOR HOMOGENISING A FOOD SUBSTANCE

CROSS REFERENCE TO RELATED APPLICATIONS

The present application is a National Stage of International Application No. PCT/EP2016/063664, filed on Jun. 15, 2016, which claims priority to European Patent Application No. 15172386.3, filed on Jun. 16, 2015, the entire contents of which are being incorporated herein by reference.

FIELD OF THE INVENTION

The field of the invention pertains to machines for homogenising a food substance, such as frothing milk or a milk-containing substance. The machine is provided with an impeller for imparting a mechanical effect to the food substance.

BACKGROUND ART

Specialty beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

The most customary way of preparing a milk-based froth is to pour the desired amount of milk into the container, immerse a steam outlet pipe from a coffee machine in the container, agitating it up and down to introduce the air needed to form the froth.

There also exists mechanical stirring appliances which are usually intended for domestic use for beating froth from more or less viscous food products such as eggs, ice, juices or the like. These appliances are usually ill-suited to froth the microbiologically sensitive liquids such as milk. Regular cleaning of the tank of the appliance needs to be envisaged in order to remove any solid food residue. In addition, heating the milk has a tendency to increase the extent to which cooked or burnt proteins are deposited on and adhere to the surfaces. The existing appliances are not, for the most part, well suited to reducing the encrustation of this solid residue, making cleaning troublesome. These appliances also have a stirring and drive mechanism which is fixed and intrudes into the tank, and this presents several disadvantages: the removal/refitting time is not insignificant, they have a tendency to become soiled more quickly, they entail additional cost as a result of the multiplicity of components, and the stirring means are difficult to clean.

U.S. Pat. No. 6,318,247 relates to an appliance for preparing hot beverages or food with stirring such as hot chocolate, for example. Other devices for stirring food products are described in patent documents WO 2004/043213 or DE 196 24 648. Stirring systems with a magnetic engagement type are described in documents U.S. Pat. No. 2,932,493, DE 1 131 372, U.S. Pat. Nos. 4,537,332 and 6,712,497. DE 89 15 094 relates to a refrigerated pot for dispensing a milk-based beverage. U.S. Pat. No. 3,356,349 discloses a stirring device that has a heated tank, magnetic drive means positioned under the tank for driving a hub located in the middle of the tank.

An improved appliance for preparing froth from a milk-based liquid or milk has been proposed in WO 2006/050900, WO 2008/142154, WO 2011/039222 and WO 2011/039224. The device has: an inner tank for receiving the liquid that is to be frothed, in which a rotatable stirrer is positioned; an outer stand holding the tank; drive and control means which are in a cavity located between the inner tank and the outer stand, and which communicate with a switch and electrical connections located on the outer surface of the stand; and disturbance means to optimise circulation of the milk during frothing. In WO 2010/023313 a steam source is associated with the stirring effect.

More recently, it has been proposed, as described in WO 2009/074555 and WO 2011/144647, to provide a coffee machine with this type of milk conditioning tank.

SUMMARY OF THE INVENTION

It is a preferred object of the present invention to provide a machine for homogenizing a food substance, such as frothing milk or a milk-based substance.

It is a preferred object of the present invention to provide a machine for heating a food substance which provides a more reliable heat management configuration.

Another preferred object of the present invention is to provide a hygienic machine for heating a food substance.

A further preferred object of the present invention is to provide a machine with an improved mechanical food conditioning of the food substance with or without heating, with or without cooling, of the food substance during conditioning.

The invention thus relates to a machine for homogenising a food substance, such as frothing milk or a milk-based substance.

The machine can be a standalone machine or a machine incorporated in a food processor such as a beverage maker e.g. a coffee maker.

The machine may be a standalone machine, e.g. directly pluggable to the mains via an electric cord, or may be integrated in a food processor arranged to process other food items or to carry out different food conditioning processes, the food processor itself being generally pluggable to the mains via an electric cord whereas the machine is a sub-part of the food processor. Such a food processor may be a beverage maker, such as a coffee maker, e.g. a beverage maker configured to prepare a beverage (such as coffee) from an ingredient capsule.

The machine of the invention may advantageously be configured to froth and/or heat and/or cool milk and optionally be associated, as a standalone machine or as an integrated machine, into a coffee maker. Standalone and integrated associations of milk frothing machines and coffee makers are for example disclosed in WO 2006/050900, WO 2008/142154, WO 2009/074555, WO 2010/023312 and WO 2010/023313.

Hence, the machine can be a milk frother which operates by incorporating finely divided gas bubbles, e.g. air bubbles, into milk. When the machine is configured for incorporating gas bubbles into the milk, it may include an operating mode without incorporation of gas bubbles.

The machine includes a container having a side wall and a bottom wall delimiting a cavity.

The container may be generally cup-shaped or bowl-shaped or cylinder-shaped, the sidewall being generally upright and the bottom wall being generally flat or curved.

The container can be provided with a thermally insulating outside material and/or with a handle, for seizure and optional displacement of the container by a human hand. Such a configuration is particularly advantageous when the food is processed at a higher temperature exceeding e.g. 50° C. or below 10° C.

The container may be provided with an optional lid for confining the food substance within the cavity.

The container can be mechanically passive. Hence, beyond the inherent mechanical properties of the materials making its structure for containing the food substance and for being integrated or assembled in the machine, the container may be free of any mechanically active part such as a motor or movement transformation system which may require special care for hygiene or cleaning purposes.

The container can be electrically passive. Hence, beyond the inherent electric properties of the materials making its structure for containing the food substance and for being integrated or assembled in the machine, the container may be free of any electric active parts such as an electric circuit of discrete or integrated components (e.g. resistors, inductances, transistors, . . . ) that require special care for hygiene or cleaning purposes.

By providing a container which is mechanically and/or electrically passive (optionally with a lid that is equally passive), it can easily be cleaned, e.g. in a dishwater, without any risk of damaging electric and/or mechanic components.

The machine has an impeller comprising an impelling member forming an impelling surface that is drivable in rotation about a central axial direction of the impelling surface for imparting a mechanical effect to the food substance in the container so as to homogenise different phases in the food substance.

For instance, the impelling surface extends over a predominant part of a bottom wall delimiting the cavity, such as an impelling surface having a surface area that is greater than 75 or 85% of the cavity's bottom wall.

The machine comprises a module which has a housing means that contains an inner chamber and that delimits a seat. When the machine is integrated in a food processor, e.g. a beverage maker such as a coffee machine, the machine's module may be integrated into the food processor whereas the container can be fixed to the module or removably mounted thereto.

The seat may be generally planar or cylindrical or cup-shaped. The container can be mounted, such as removably mounted, in or on this seat.

The container can be mounted, such as removably mounted, on or in the seat. The container may be assembled to or on the seat or simply placed on or in the seat. For instance, the container is removable from the seat for normal operation, e.g. to dispense the food substance, e.g. milk, from the container. The container can be removable from the seat for servicing or maintenances purposes only.

The chamber contains one or more electric components that include an electric motor for driving the impelling member in the container. The electric components may include a control unit and/or a power management unit.

Typically, such control unit is in data-communication with a user-interface for the input of user-requests corresponding to driving the impeller and/or other processes such as cooling and/or heating the container. The user interface can include one or more user-selectors, e.g. push and/or turn buttons, a touch-screen, touch-pad, etc.

The electric motor has an output drive axis with a driver device configured to drive in the container a follower device of the impeller.

The control unit, when present, may be programmed or otherwise configured to carry out one or more heating and/or cooling and/or mechanical conditioning profiles (e.g. using the impeller) on the food substance on request of a user. The control unit may for instance be associated with a memory device for storing the different programs that can be carried out by the control unit.

The driver device and the follower device may be configured to rotate about the central axial direction.

The driver device and the follower device are magnetically coupled through a sidewall and/or bottom wall of the container. The magnetic coupling force can be in the range of 3 to 50 such, as 5 to 25, e.g. 10 to 15 N.

The driver device comprises a magnetic field-generating element that is arranged to be magnetically coupled to a corresponding ferromagnetic or magnetic field-generating element of the follower device. Alternatively, the follower device comprises a magnetic field-generating element that is arranged to be magnetically coupled to a corresponding ferromagnetic element of the driver device.

In accordance with the invention, the follower device extends:
   over a predominant part of the bottom wall of the container, the follower device extending typically over at least 75 or 85% of a surface area of the bottom wall, the follower device having for instance the general shape of a plate, e.g. disc, extending over the bottom wall and generally in parallel thereto; or
   across a substantial part of the bottom wall along a diameter thereof, the follower device extending typically over at least 75 or 85% of a diameter of the bottom wall, the follower device can be an elongated generally rod-shaped or bar-shaped member (e.g. extending along the bottom wall's diameter) or be formed of a plurality of such elongated members (e.g. up to 6 or 10) in a star arrangement.

The driver device extends:
   over a predominant part of a bottom part of the seat, the driver device extending typically over at least 75 or 85% of a surface area of the bottom part, the driver device having for instance the general shape of a plate, e.g. disc, extending over the bottom part and generally in parallel thereto; or
   across a substantial part of the bottom part of the seat along a diameter thereof, the driver device extending typically over at least 75 or 85% of a diameter of the bottom part, the driver device can be an elongated generally rod-shaped or bar-shaped member (e.g. extending along the bottom wall's diameter) or be formed of a plurality of such elongated members (e.g. up to 6 or 10) in a star arrangement.

The magnetic field generating element(s) and, when present, the ferromagnetic element(s) are positioned at extremal or peripheral parts of the follower device and of the driver device.

In such a configuration of the field generating element(s) and (when present) of the optional ferromagnetic element(s), the torque transmission between the driver and follower devices via such elements can be maximised. This is particularly advantageous when the impeller has a high inertia and/or is exposed to a significant resistance, e.g. when the contact surface between the impeller and the food substance is high.

These elements may face each other via the sidewall and/or bottom wall of the container and optionally via the housing means. These elements can face each other via:
   the bottom wall along a coupling axis that is generally parallel to the central axial direction; and/or the sidewall along a coupling axis that is generally orthogonal to the sidewall, such as a coupling axis that intercepts the central axial direction.

The magnetic field-generating element(s) can comprise(s) an electromagnet element or a permanent magnet element, e.g. made of at least one of iron, nickel, cobalt, rare earth metals, e.g. lanthanide, and alloys and oxides containing such metals as well as polymers (e.g. plastics) carrying such elements and components.

The ferromagnetic element(s) may be made of at least one of Co, Fe, $Fe_2O_3$, $FeOFe_2O_3$, $NiOFe_2O_3$, $CuOFe_2O_3$, $MgO Fe_2O_3$, $Nd_2Fe_{14}B$, Mn, Bi, Ni, MnSb, $MnOFe_2O_3$, $Y_3Fe_5O_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SmCo_5$, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

Electromagnetic elements may be used to control the position and/or the orientation of the impeller in the container.

The driver device can directly face the sidewall and/or bottom wall of the container.

The driver device may face indirectly the sidewall and/or bottom wall of the container via a housing inner sidewall and/or inner bottom wall delimiting the seat.

The impeller can have, further to the impelling member, a foot for spacing the impelling member above a bottom wall of the container, such as a foot spaced under the impelling member by a distance in the range of 0.5 to 2.5 cm e.g. 1 to 2 cm.

The impeller may have a foot that has a downwardly-oriented convex curved contact surface, e.g. a downwardly projecting pin, such that the impeller rests on the bottom wall entirely via this convex curved contact surface. The convex curved contact can be in contact with the bottom wall over a total surface area of typically less than 5 $mm^2$, such as less than 4 e.g. less than 3 for instance less than 2 for example less than 0.3 $mm^2$.

The contact surface can be made of hard polymeric material, such as hard plastic, or of food-safe stainless steel and be supported by a surface of the bottom wall made of ceramic material, such as PTFE, or of food-safe stainless steel e.g. AiSi 304 steel.

The impeller can be maintained in equilibrium on the downwardly-oriented convex curved contact surface:
- as a pendulum, by having its centre of gravity located vertically below the contact surface; or
- as an inverted pendulum, by having its centre of gravity located vertically above the contact surface and by being balanced by magnetic forces, e.g. by a self-adapting magnetic stabilising arrangement including for instance the magnetic field-generating element, and/or by being driven in rotation as a spinning top.

The impeller may have a foot that has the follower device.

The impelling surface may generally be disc-shaped or conically-shaped or shaped as a star.

The impelling surface can have at least one part protruding or recessed in a direction parallel to the axial direction, such as a part undulated along a circular direction about the axial direction or a surface with a generally upright radial protruding or recessed part.

The impelling member, especially when provided with a disc-shaped or conically-shaped impelling surface, may have at least one opening which extends through the member from the impelling surface to an opposite surface of the member. The opening can be a bubble refiner opening, such as an opening for refining gas bubbles contained in the food substance by dividing gas bubbles contained in the food substance, e.g. dividing air bubbles contained in milk.

Such opening can be delimited by at least one portion that has along the opening an orientation which is angled away from a direction of movement of the portion when the impelling surface is driven in rotation about the central axial direction. For instance, the orientation is orthogonal to the direction of movement.

The opening may be confined by a notional circular sector defined on the disc-shaped or conically-shaped impelling surface and extend to the opposite surface.

Such sector may extend over an angle in the range of 1 to 359°, such as 5 to 270°, e.g. 15 to 180° for instance 30 to 90°.

Portions of the member that are adjacent to radii defining the sector and that delimit the opening may be configured to part gas bubbles contained in the food substance when the gas bubbles extend into or through the opening while the impelling surface is driven in rotation.

At least one opening can have a generally arched shape, e.g. a general shape of a kidney or bean, such as a shape extending around the central axial direction.

At least one opening may have a generally circular shape, such as a circular shape that is located off the central axial direction.

At least one opening can have a generally oval or elliptic shape, such as a shape extending radially on the member.

At least one opening may have a generally polygonal shape such as a shape that is located off the central axial direction.

At least one opening can extend as (an) individual opening(s) from a position adjacent to the central axial direction to a position adjacent to a peripheral perimeter of the member.

At least one opening may be located next to the central axial direction.

At least one opening can be located on the central axial direction.

A plurality of openings may form an openwork of two or more spaced opening. The openings can be angled apart about the central axial direction. The openings may be contained within and radially extend over different juxtaposed or overlapping notional annulus which together extend substantially uninterruptedly over an overall notional continuous annulus.

The module and the follower device can each be provided with a removal magnetic field-generating element, such as removal elements that face each other via the bottom wall of the container and optionally via the housing means. The removal elements may be mounted in a mutually repulsive orientation to facilitate a separation of the follower device from the driver device.

The removal elements may face each other along an axis that is collinear with or generally parallel to the central axial direction. For instance, the removal elements comprise a pair of removal elements facing each other along the an axis that is collinear with the central axial direction.

The removal elements can generate together such a repulsive force that separating the follower device from the driver device (when magnetically coupled in the machine) requires a maximum force that is less than 15 N, such as less than 10 N, e.g. less than 5 N. This maximum force results from the difference between the (greater) overall coupling force and the (smaller) overall removal force.

The magnetic removal force itself (generated by the removal elements) can be in the range of 2 to 40 such, as 4 to 30, e.g. 8 to 15 N.

The module and the follower device may be provided with a plurality of pairs of such removal magnetic field-generating elements that are mounted in mutually repulsive orientation, optionally mounted about the central axial direction.

The removal element of the module can be located in or on: the driver device and/or the housing means.

For example, the removal magnetic field-generating elements act in mutual repulsion along or in parallel to the rotation axis of the driver device and follower device. The magnetic field-generating element(s) (and when present the ferromagnetic element) for coupling the driver and the follower devices can work in attraction along or in parallel to the rotation axis to transmit a transmission torque about the rotation axis when the driver device is moved in rotation whereby the follower device is driven magnetically to follow the driver device. In such a case the repulsive elements act against the attraction of the coupling elements along the rotation axis without significantly reducing the attraction of the coupling elements about the rotation axis (i.e. the torque transmission). Such a configuration leads to the transmission of a high torque between the driver device and the follower device, especially when the magnetic coupling elements are located at extremal positions of the driver and follower devices, while limiting the mutual attraction between the driver and follower devices (reduced by the presence of the removal elements.

The use of such removal elements is particular advantageous when elements or relatively strong mutual attraction or retention are used to transmit a drive action from a motor to the impeller. Such removal elements can be oriented to separate the impeller from the container in a direction that is orthogonal to the movement (e.g. rotation) of the impeller in the container. Hence, the force (e.g. torque) for driving the impeller is not or significantly not affect by the removal elements that act against maintaining the impeller in the container.

The electric components can comprise one or more generators for heating and/or cooling the food substance in the container. The generator may be controlled by a control unit according to a processing program of the food substance, such as a program for driving the impeller with or without heating or cooling via the generator.

The one or more electric components can include an active cooling device, such as a refrigerating device, for cooling the food substance in the container. This cooling device may be activated and/or deactivated while driving the impeller.

The or at least one of the generators can be configured to generate an oscillating electromagnetic field directed to the container for heating the food substance in the container.

The generator can be configured to induce an electric heating current in an inductively heatable component of such machine, the inductively heatable component having a surface for radiating heat into the cavity. The component can be located in the cavity or form a wall of the container, whereby the component surface delimits the cavity. The component may be made of aluminium or food-safe stainless e.g. AiSi 304. The generator may include at least one induction coil, such as an induction coil located adjacent to the separation section.

The generator may be configured to emit microwaves for generating heating microwaves directly in the food substance in the container. Such a microwave generator can operate according to the known principles as for example known in the food heating technology, e.g. microwave ovens. The container can made of electrically non-conductive glass or polymeric material.

The machine of the invention can include a control system (e.g. contained in the control unit) of the heating and/or cooling generator(s) for:

carrying out different heating/cooling profiles over time and/or for carrying out one or more heating/cooling profiles of constant or variable heating/cooling; and/or disabling the heating/cooling.

At least one of the above one or more electric components may radiate heat within the chamber when electrically powered. The heat may be generated by an electric resistance of the component.

The housing means can have a separation section and an outside section distinct from the separation section, the separation section and the outside section delimiting at least part of the chamber. The separation section may separate the chamber from the seat. The outside section can be separated from the seat by the chamber. The separation section and the outside section may have such respective thermal conductivities as to promote an evacuation of the heat radiated within the chamber outside the module via the outside section rather than into the container via the separation section.

The separation and the outside sections can be such that the ratio of heat evacuated via the outside section over heat evacuated via the separation section is of more than 2 such as at least 4 e.g. at least 9.

By providing a preferential heat evacuation path (via the outside section) from the module chamber to minimise a transfer of such heat into the container, the heat generated in the container originates mainly from the electromagnetic field directed to the container by the generator and is not or only insignificantly influenced by the heat generated within the module's chamber. Consequently, the heat generation depends predominantly on an appropriate control of the generator (rather than on unwanted heat generated within the chamber). As a corollary, when the generator is switched off because no heating is temporarily desired in the container (or when the container is actively cooled, when such feature is available), the container is not (or only insignificantly) exposed to unwanted heat from within the chamber. Indeed such unwanted heat is predominantly evacuated via the outside section to outside the machine rather than via the separation section into the seat and then into the container.

The separation section may surround at least partly the seat, the separation section forming for instance an upright wall surrounding the seat and/or a trough or platform delimiting a bottom of the seat.

The housing means may include a joining section that joins the separation section to the outside section, such as a joining section forming an outer sidewall of the housing means. The joining section may comprise the below-mentioned lateral section or may be a further section.

The outside section can form a base or foot of the housing means.

The housing means can include a lateral section extending laterally down along an edge of the outside section, such as a lateral section having one or more through openings for passing heat evacuated via the outside section from under the outside section to laterally outside the housing means.

The housing means may include a lateral section extending laterally down to above an edge of the outside section, the outside section having optionally one or more evacuation channels for passing heat evacuated via the outside section underneath the lateral section to outside the housing means.

The outside section may include a cooling device such as at least one of a radiator, a dissipator, e.g. a ventilator, and a heat sink. The cooling device may have a plurality of protrusions and recesses forming a surface for thermal exchange between the chamber and outside such machine. Such a cooling device can be different from a cooling device for cooling the food substance in the container.

The chamber can have a first chamber (e.g. sub-chamber) containing at least one of the electric motor, a control unit and a power management unit, such as a base chamber or a chamber below the seat.

The chamber may have second chamber (e.g. a sub-chamber) containing a heating and/or cooling generator, such as an upper chamber e.g. a chamber formed around the seat.

The first and second chambers can be separated by a partition section of the housing means.

The second chamber may be adjacent to the seat via the housing means. The first chamber can be distant to the seat or adjacent thereto via the housing means.

The machine can include a further food phase homogenisation device comprising at least one of:
 an expansion chamber such as a venturi chamber, e.g. as disclosed in WO01/26520 and WO2012/097916;
 a static mixer, e.g. as disclosed in WO2012/097916; and
 a couette flow device, e.g. as disclosed in WO2014/096183.

The further food phase homogenisation device can be located at an outlet of the container.

The further food phase homogenisation device may operate with steam and/or air in combination with said food substance e.g. milk.

BRIEF DESCRIPTION OF THE DRAWINGS

The invention will now be described with reference to the schematic drawings, wherein:

FIG. 1 is a cross-sectional perspective view of a machine having an impeller and a container according to the invention, the container being for instance mounted in a module;

FIG. 1a is an enlarged cross-sectional view of the central bottom part of the container of FIG. 1 when resting on the module of FIG. 1;

FIG. 2 is a cross-section of the module of FIG. 1 without container;

FIG. 3 is an external view of the module of FIG. 1;

FIG. 4 shows an outside section of the module of FIG. 1 which outside section is configured for evacuating heat outside the module;

FIGS. 5 to 7 illustrate different impellers that can be placed into the container of FIG. 1 for imparting a mechanical effect to a food substance container in the container.

DETAILED DESCRIPTION

Figure 8:
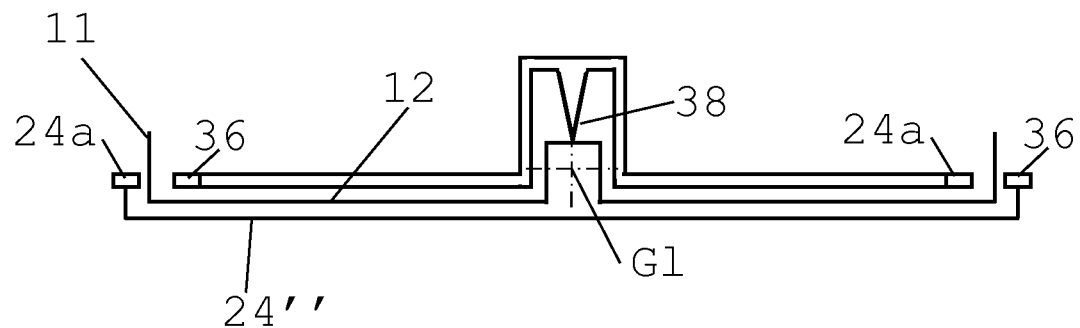
FIGS. 8 and 9 schematically illustrate two different configurations of the impeller resting in the container.
Figure 9:
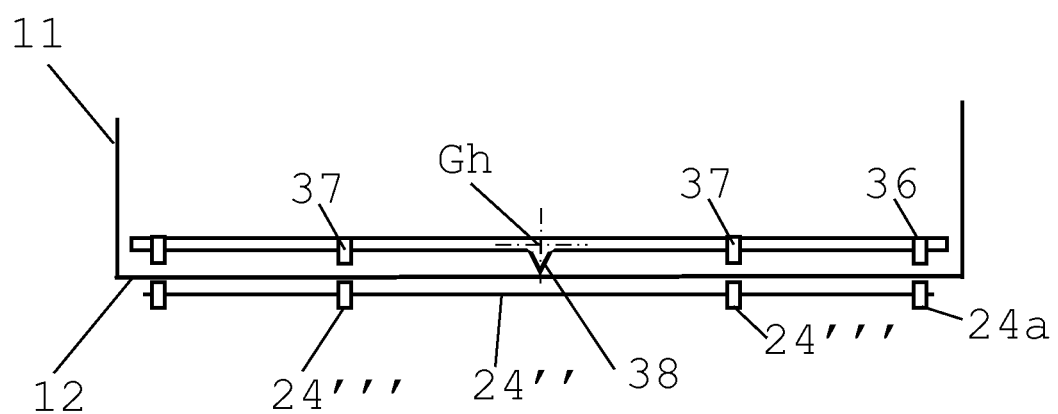

FIGS. 1 to 4 illustrate an embodiment of a machine 1 for homogenising a food substance, such as frothing milk or a milk-based substance. FIGS. 5 to 7 illustrate different impeller surfaces for imparting a mechanical effect to the food substance. FIGS. 8 and 9 illustrate different foot arrangements and magnetic arrangements of an impeller and module.

Machine 1 can be a standalone machine or a machine incorporated in a food processor such as a beverage maker e.g. a coffee maker.

Machine 1 includes a container 10, such as a mechanically and/or electrically passive container 10, having a side wall 11 and a bottom wall 12 delimiting a cavity 10'.

Container 10 can be generally cup-shaped or bowl-shaped or cylinder-shaped, sidewall 11 being generally upright and bottom wall 12 being generally flat or curved.

Container 10 may be provided with a thermally insulating outside material 10" and/or with a handle, for seizure and optional displacement of container 10 by a human hand.

Machine 1 has an impeller 30 comprising an impelling member 31 forming an impelling surface 31',31",31''' that is drivable in rotation r about a central axial direction 30' of impelling surface 31',31",31''' for imparting a mechanical effect to the food substance in container 10 to homogenise different phases in the food substance. Impelling surface 31',31",31''' may extend over a predominant part of bottom wall 12. Impelling surface 31',31",31''' can have a surface area that is greater than 75 or 85% of bottom wall 12.

Machine 1 includes a module 20 which has a housing means 22' that contains an inner chamber 22,22a and that delimits a seat 21, such as a generally planar or cylindrical or cup-shaped seat 21, on or in which container 10 is mounted, such as removably mounted. Chamber 22,22a contains one or more electric components 23,24,25,26 that include an electric motor 24 for driving impelling member 31 in container 10. Electric components 23,24,25,26 may include a control unit 25 and/or a power management unit 26.

Electric motor 24 can have an output drive axis 24' with a driver device 24" configured to drive in container 10 a follower device 35 of impeller 30. Driver device 24" and follower device 25 may be configured to rotate about central axial direction 30'. Driver device 24" and follower device 35 are magnetically coupled through a sidewall 11 and/or bottom wall 12 of container 10.

Driver device 24" may have a magnetic field-generating element 24a that is arranged to be magnetically coupled to a corresponding ferromagnetic or magnetic field-generating element 36 of follower device 35. Alternatively, follower device 24" can have a magnetic field-generating element 36 that is arranged to be magnetically coupled to a corresponding ferromagnetic element 24a of driver device 35.

Follower device 35 extends: over a predominant part of bottom wall 12, follower device 35 extending typically over at least 75 or 85% of a surface area of bottom wall 12; or across a substantial part of the bottom wall 12 along a diameter thereof, follower device 35 extending typically over at least 75 or 85% of a diameter of the bottom wall.

Driver device 24 extends: over a predominant part of bottom part of seat 21, driver device 24 extending typically over at least 75 or 85% of a surface area of the bottom part; or across a substantial part of the bottom part of seat 21 along a diameter thereof, driver device 24 extending typically over at least 75 or 85% of a diameter of the bottom part.

Magnetic field generating element(s) 24a,36 and, when present, ferromagnetic element(s) 24a,36 are positioned at extremal or peripheral parts of follower device 35 and of driver device 24".

Elements 24a,36 can face each other via sidewall 11 and/or bottom wall 12 of container 10 and optionally via housing means 22'. For instance, elements 24a,36 face each other via:
 bottom wall 12 along a coupling axis 30" that is generally parallel to central axial direction 30'; and/or
 the sidewall along a coupling axis that is generally orthogonal to the sidewall, such as a coupling axis that intercepts the central axial direction.

The magnetic field-generating element(s) 24a,36 may include an electromagnet element or a permanent magnet element, e.g. made of at least one of iron, nickel, cobalt, rare earth metals, e.g. lanthanide, and alloys and oxides containing such metals as well as polymers (e.g. plastics) carrying such elements and components.

Ferromagnetic element(s) 24a,36 can be made of at least one of Co, Fe, $Fe_2O_3$, $FeOFe_2O_3$, $NiOFe_2O_3$, $CuOFe_2O_3$, $MgO\ Fe_2O_3$, $Nd_2Fe_{14}B$, Mn, Bi, Ni, MnSb, $MnOFe_2O_3$, $Y_3Fe_5O_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SmCo_5$, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

Driver device 24" may face directly sidewall 11 and/or bottom wall 12 of container 10.

Driver device 24" can face indirectly sidewall 11 and/or bottom wall 12 of container 10 via a housing inner sidewall and/or inner bottom wall 22" delimiting seat 21.

Impeller 30 may have, further to impelling member 31, a foot 35,38 for spacing impelling member 31 above bottom wall 12 of container 10. Foot 35,38 may be spaced under impelling member 31 by a distance d in the range of 0.5 to 2.5 cm e.g. 1 to 2 cm.

Impeller 30 can have a foot 35,38 that has a downwardly-oriented convex curved contact surface 38, e.g. a downwardly projecting pin 38, such that impeller rests on bottom wall 12 entirely via convex curved contact surface 38. Convex curved contact can be in contact with bottom wall 12 over a total surface area of typically less than 5 $mm^2$, such as less than 4 e.g. less than 3 for instance less than 2 for example less than 0.3 $mm^2$.

For instance, contact surface 38 is made of hard polymeric material, such as hard plastic, or of food-safe stainless steel and is supported by a surface of bottom wall 12 made of ceramic material, such as PTFE, or of food-safe stainless steel e.g. AiSi 304 steel.

Impeller 30 may be maintained in equilibrium on downwardly-oriented convex curved contact surface 38:
as a pendulum, by having its centre of gravity Gl located vertically below contact surface 38 (FIG. 8); or
as an inverted pendulum, by having its centre of gravity Gh located vertically above contact surface 38 and by being balanced by magnetic forces, e.g. by a self-adapting magnetic stabilising arrangement including for instance magnetic field-generating element 24a,36, and/or by being driven in rotation as a spinning top. See FIG. 9.

Motor 24 of the embodiments schematically illustrated in FIGS. 8 and 9 can be a motor formed of a sole stator driving the follower device as a rotor or a motor with an output axis having a driving device driving the follower device.

Impeller 30 may incorporate follower device 35.

Impelling surface 31',31",31'" can be generally disc-shaped or conically-shaped or shaped as a star. Impelling surface 31',31",31'" may have at least one part 31',31",31'" protruding or recessed in a direction parallel to axial direction 30', such as a part 31',31" undulated along a circular direction about axial direction 30' or a surface with a generally upright radial protruding or recessed part 31'".

Impelling member 31 may have at least one opening 31a,31b1,31b2,31b4,31b4,31c,31c',31d1,31d2 which extends through member 31 from impelling surface 31',31", 31'" to an opposite surface $31^{IV}$ of member 31. The opening can be a bubble refiner opening 31a,31b1,31b2,31b4,31b4, 31c, 31c',31d1,31d2, e.g. operating by dividing gas bubbles contained in the food substance for instance to divide air bubbles contained in milk.

Opening 31a,31b1,31b2,31b4,31b4,31c,31c',31d1,31d2 can be delimited by at least one portion 31bx,31by, 31cx, 31cy,31cx',31cy' that has along opening 31a,31b1,31b2, 31b4,31b4,31c,31c',31d1,31d2 an orientation 31n which is angled away from a direction of movement 31r of portion 31bx,31by, 31cx,31xy,31cx',31cy' when impelling surface 31',31",31'" is driven in rotation r about central axial direction 30', such as an orientation 31n that is orthogonal to direction of movement 31r.

Opening 31a,31b1,31b2,31b4,31b4,31c,31c',31d1,31d2 may be confined by a notional circular sector 31x,31y,31z that is defined on disc-shaped or conically-shaped impelling surface 31',31",31'" and that extends to opposite surface $31^{IV}$.

Such sector 31x,31y,31z can extend over an angle in the range of 1 to 359°, such as 5 to 270°, e.g. 15 to 180° for instance 30 to 90°.

Portions 31by, 31by, 31cx,31cy,31dx,31dy of member 31 that are adjacent to radii 31x,31y defining sector 31x,31y,31z and that delimit such opening 31a,31b1,31b2, 31b4,31b4, 31c,31d1,31d2 can be configured to part gas bubbles contained in the food substance when the gas bubbles extend into or through opening 31a,31b1,31b2,31b4,31b4,31c, 31d1,31d2 while impelling surface 31',31",31'" is driven in rotation.

At least one opening 31a can have a generally arched shape, e.g. a general shape of a kidney or bean, such as a shape 31a extending around central axial direction 30'.

At least one opening 31b1,31b2,31b3,31b4 may have a generally circular shape, such as a circular shape that is located off the central axial direction 30'.

At least one opening 31c,31c' can have a generally oval or elliptic shape, such as a shape extending radially on the member 31.

At least one opening 31d1,31d2 may have a generally polygonal shape such as a shape that is located off central axial direction 30'.

At least one opening 31c may extend as (an) individual opening(s) from a position 31ca adjacent to central axial direction 30' to a position 31cb adjacent to a peripheral perimeter of member 31.

At least one opening 31a,31b1,31b2,31b4,31b4,31c, 31d1,31d2 can be located next to axial direction 30'.

At least one opening 31c' may be located on central axial direction 30'.

A plurality of openings 31b1,31b2,31b3,31b4; 31c, 31c'; 31d1,31d2 may form an openwork of two or more spaced openings 31b1,31b2,31b3,31b4; 31c,31c'; 31d1,31d2. Openings 31b1,31b2,31b3,31b4; 31c,31c'; 31d1,31d2 can be angled apart about central axial direction 30'. Openings 31b1,31b2,31b3,31b4; 31c,31c'; 31d1,31d2 may be contained within and radially extend over different juxtaposed or overlapping notional annulus 31ba_31bf,31bb_31be, 31bc_31bg,31bd_31bh; 31da_31dd, 31db_31dc which together extend substantially uninterruptedly over an overall notional continuous annulus 31ba_31bb; 31da_31db.

Module 20 and follower device 35 can each be provided with a removal magnetic field-generating element 24'",37, such as removal elements 24'",37 that face each other via bottom wall 12 of container 10 and optionally via housing means 22'. Removal elements 24'",37 can be mounted in a mutually repulsive orientation to facilitate a separation of follower device 35 from driver device 24".

Removal elements 24′″,37 may face each other along an axis 30′ that is collinear with or generally parallel to central axial direction 30′, removal elements 24′″,37 comprising for instance a pair removal elements 24′″,37 facing each other along an axis 30′ that is collinear with central axial direction 30′.

Removal elements 24′″,37 can generate together such a repulsive force that separating follower device 35 from driver device 24″ when magnetically coupled requires a maximum force that is less than 15 N, such as less than 10 N, e.g. less than 5 N. This maximum force results from the difference between the (greater) overall coupling force and the (smaller) overall removal force.

The magnetic removal force itself (generated by the removal elements) can be in the range of 2 to 40 such, as 4 to 30, e.g. 8 to 15 N.

Module 20 and follower device 35 can be provided with a plurality of pairs of such removal magnetic field-generating elements that are mounted in mutually repulsive orientation, optionally mounted about the central axial direction. Removal element 24′″ of module 20 can be located in or on: driver device 24″ and/or housing means 22′.

Electric components 23,24,25,26 may include one or more generators 23 for heating and/or cooling the food substance in container 10.

Generator 23 may be controlled by a control unit 25 according to a processing program of the food substance, such as a program for driving the impeller 30 with or without heating or cooling via generator 23.

At least one generator 23 can be configured to generate an oscillating electromagnetic field directed to container 10 for heating the food substance therein.

Generator 23 can be configured to induce an electric heating current in an inductively heatable component 11 of such machine 1. Inductively heatable component 11 may have a surface 11′ for radiating heat into cavity 10′. component 11 can be located in the cavity or can form a wall 11 of container 10, whereby component surface 11′ delimits cavity 10′.

Generator 23 can include at least one induction coil, such as an induction coil located adjacent to separation section 22″.

Generator 23 may emit microwaves for generating heating microwaves directly in the food substance in container 10.

At least one of electric components 23,24,25,26 may radiate heat within chamber 22,22a when electrically powered, such as heat generated by an electric resistance of component 23,24,25,26. Housing means 22′ can have a separation section 22″ and an outside section 22′″ distinct from separation section 22″. The separation section and the outside section may delimit at least part of chamber 22,22a. Separation section 22′″ may separate chamber 22,22a from seat 21. Outside section 22′″ can be separated from seat 21 by chamber 22,22a. Separation section 22″ and outside section 22′″ may have such respective thermal conductivities as to promote an evacuation of heat radiated within chamber 22,22a outside module 20 via outside section 22′″ rather than into container 10 via separation section 22″.

Separation and outside sections 22″,22′″ can be such that the ratio of heat evacuated via outside section 22′″ over heat evacuated via separation section 22″ is of more than 2 such as at least 4 e.g. at least 9.

Separation section 22″ may surround at least partly seat 21, separation section 22″ forming for instance an upright wall surrounding seat 21 and/or a trough or platform delimiting a bottom of seat 21.

Housing means 22′ may have a joining section 22$^{IV}$ that joins separation section 22″ to outside section 22′″, such as a joining section forming an outer sidewall of housing means 22′.

Outside section 22′″ can form a base or foot of housing means 22′.

Housing means 22′ can include a lateral section 22$^{IV}$ extending laterally down along an edge of outside section 22′″, such as a lateral section 22$^{IV}$ having one or more through openings 22$^{V}$ for passing heat evacuated via the outside section from under outside section 22′″ to laterally outside housing means 22′.

Housing means 22′ can include a lateral section 22$^{IV}$ extending laterally down to above an edge of the outside section. For instance, the outside section has one or more evacuation channels for passing heat evacuated via the outside section underneath the lateral section to outside housing means 22′.

Outside section 22′″ can include a cooling device such as at least one of a radiator, a dissipator, e.g. a ventilator, and a heat sink. Optionally, the cooling device comprises a plurality of protrusions 221 and recesses 222 forming a surface for thermal exchange between chamber 22,22a and outside such machine 1.

Chamber 22,22a may have a first chamber 22 containing at least one of electric motor 24, a control unit 25 and a power management unit 26, such as a base chamber 22 or a chamber below seat 21.

Chamber 22,22a may have a second chamber 22a containing a heating and/or cooling generator 23, such as an upper chamber e.g. a chamber formed around seat 21.

First and second chambers can be separated by a partition section 22$^{V}$ of housing means 22′.

Second chamber 22a can be adjacent to seat 21 via housing means 21 and first chamber 22 can be distant to seat 21 or adjacent thereto via housing means 22′.

Machine 1 may incorporate a further food phase homogenisation device including at least one of:
an expansion chamber such as a venturi chamber;
a static mixer; and
a couette flow device.

Such further food phase homogenisation device can be located at an outlet of container 10.

Such further food phase homogenisation device may operate with steam and/or air in combination with the food substance e.g. milk.

The invention claimed is:

1. A machine for homogenising a food substance, the machine comprising:
   a container having a side wall and a bottom wall defining a cavity;
   an impeller comprising an impelling member forming an impelling surface that is drivable in rotation about a central axial direction of the impelling surface for imparting a mechanical effect to the food substance in the container to homogenise different phases in the food substance; and
   a module which has a housing that contains an inner chamber and that defines a seat on or in which the container is mounted, the inner chamber containing one or more electric components that include an electric motor for driving the impelling member in the container,
   the electric motor having an output drive axis with a driver device configured to drive in the container a follower device of the impeller, the driver device and the follower device being magnetically coupled through the sidewall and/or the bottom wall of the container, and wherein:

the driver device comprises a magnetic field-generating element that is arranged to be magnetically coupled to a corresponding ferromagnetic element of the follower device;

the follower device comprises a magnetic field-generating element that is arranged to be magnetically coupled to a corresponding ferromagnetic element of the driver device; or the driver device comprises a magnetic field-generating element that is arranged to be magnetically coupled to a corresponding magnetic field-generating element of the follower device;

the follower device extends in a direction selected from the group consisting of:

over a predominant part of the bottom wall of the container; and across a substantial part of the bottom wall of the container along a diameter thereof;

wherein the driver device extends in a direction selected from the group consisting of:

over a predominant part of a bottom part of the seat; and across a substantial part of the bottom part of the seat along a diameter thereof;

the driver device comprises a plurality of first elements, and the follower device comprises a plurality of second elements each respectively arranged to be magnetically coupled to a corresponding one of the plurality of first elements to form a plurality of pairs of such elements, wherein the plurality of first elements are magnetically coupled to the corresponding one of the plurality of second elements through a bottom wall of the container, and wherein the plurality of first and second elements are positioned at extremal or peripheral parts of the driver device and of the follower device, and the machine has a configuration selected from the group consisting of (i) the plurality of first elements are magnetic field-generating elements, and the plurality of second elements are ferromagnetic elements; (ii) the plurality of second elements are magnetic field-generating elements, and the plurality of first elements are ferromagnetic elements, and (iii) the plurality of first elements are first magnetic field-generating elements, and the plurality of second elements are second magnetic field-generating elements; and wherein the impeller comprises the follower device, and the machine comprises the driver device.

2. The machine of claim 1, wherein the magnetic field-generating elements each comprise an electromagnet element or a permanent magnet element.

3. The machine of claim 1, wherein the driver device faces directly the bottom wall of the container or faces indirectly the bottom wall of the container via the inner bottom wall delimiting the seat.

4. The machine of claim 1, wherein the impeller has, further to the impelling member, a foot for spacing the impelling member above the bottom wall of the container.

5. The machine of claim 1, wherein the impeller has a foot comprising:

a downwardly-oriented convex curved contact surface, such that the impeller rests on the bottom wall of the container entirely via said downwardly-oriented convex curved contact surface, the downwardly-oriented convex curved contact surface being in contact with the bottom wall of the container over a total surface area; and/or the follower device.

6. The machine of claim 1, wherein the impelling surface has a surface that generally has a shape selected from the group consisting of: disc-shaped, conically-shaped, and shaped as a star.

7. The machine of claim 6, wherein the impelling member has at least one opening, the at least one opening being oriented in a position selected from the group consisting of:

defined by at least one portion that has along the at least one opening an orientation which is angled away from a direction of movement of the at least one portion when the impelling surface is driven in rotation about the central axial direction; and confined by a notional circular sector defined on the conically-shaped impelling surface and extending to an opposite surface.

8. The machine of claim 7, wherein one or more of the at least one opening exhibit at least one feature selected from the group consisting of:

having a generally arched shape;

having a generally circular shape;

having a generally oval or elliptic shape;

having a generally polygonal shape;

extending as an individual opening from a position adjacent to the central axial direction to a position adjacent to a peripheral perimeter of the impelling member;

being located next to the central axial direction;

being located on the central axial direction; and a plurality of openings forming an openwork of two or more spaced openings.

9. The machine of claim 1, wherein the module and the follower device are each provided with removal magnetic field-generating elements, the removal magnetic field-generating elements being mounted in a mutually repulsive orientation configured to facilitate a separation of the follower device from the driver device.

10. The machine of claim 1, wherein the one or more electric components comprise one or more generators for heating and/or cooling the food substance in the container.

11. The machine of claim 10, wherein at least one of the one or more generators is configured to generate an oscillating electromagnetic field directed to the container for heating the food substance in the container.

12. The machine of claim 1, wherein at least one of the one or more electric components radiates heat within the inner chamber when electrically powered, the housing having a separation section and an outside section distinct from the separation section, the separation section and the outside section defining at least part of the inner chamber, the separation section separating the inner chamber from the seat, the outside section being separated from the seat by the inner chamber, the separation section and the outside section having such respective thermal conductivities as to promote an evacuation of the heat radiated within the inner chamber outside the module via the outside section rather than into the container via the separation section.

13. The machine of claim 12, wherein the outside section:

forms a base or a foot of the housing; and/or includes a cooling device.

14. The machine of claim 1, wherein the inner chamber comprises:

a first inner chamber containing at least one of the electric motor, a control unit and a power management unit; and a second inner chamber containing a heating and/or cooling generator.

15. The machine of claim 1, wherein the follower device extends in a direction selected from the group consisting of:
over at least 75% of the surface area of the bottom wall of the container; and
over at least 75% of the diameter of the bottom wall of the container;
and wherein the driver device extends in a direction selected from the group consisting of:
over at least 75% of the surface area of the bottom part of the seat; and
over at least 75% of the diameter of the bottom part of the seat.

16. The machine of claim 1, wherein the module and the follower device comprise a plurality of removal magnetic field-generating elements that are mounted in a mutually repulsive orientation about the central axial direction.

17. The machine of claim 1, comprising a further food phase homogenisation device comprising at least one element selected from the group consisting of:
an expansion chamber;
a static mixer; and
a couette flow device.

18. The machine of claim 1, wherein the impelling surface has at least one part protruding or recessed in a direction parallel to the axial direction and has a configuration selected from the group consisting of (i) undulated along a circular direction about the axial direction and (ii) generally upright.

19. The machine of claim 1, wherein the impeller has a foot comprising:
a downwardly-oriented convex curved contact surface, such that the impeller rests on the bottom wall of the container entirely via said downwardly-oriented convex curved contact surface, the downwardly-oriented convex curved contact surface being in contact with the bottom wall of the container over a total surface area of less than 5 $mm^2$; and/or the follower device.

20. The machine of claim 1, wherein at least one of the one or more electric components is configured to radiate heat within the inner chamber when electrically powered, the housing further comprising an outside section separated from the seat by the inner chamber, the outside section comprising at least one evacuation channel configured to pass the heat from the inner chamber to an outside of the housing through the at least one evacuation channel of the outside section.

* * * * *